(12) United States Patent
Agarwal et al.

(10) Patent No.: US 7,378,966 B2
(45) Date of Patent: May 27, 2008

(54) RFID DEVICE GROUPS

(75) Inventors: Abhishek Agarwal, Hyderabad (IN); Anush Kumar, Seattle, WA (US); Balasubramanian Sriram, Hyderabad (IN); Bhuvanesh Jain, Chennai (IN); Jayaram Kalyana Sundaram, Hyderabad (IN); Krishnan Gopalan, Hyderabad (IN); Ramachandran Venkatesh, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 263 days.

(21) Appl. No.: 11/325,181

(22) Filed: Jan. 4, 2006

(65) Prior Publication Data

US 2007/0159304 A1     Jul. 12, 2007

(51) Int. Cl.
*G08B 13/14*     (2006.01)

(52) U.S. Cl. .............. 340/572.1; 340/572.4; 340/572.8; 340/10.1; 340/10.51; 340/539.22; 340/825.69; 709/220

(58) Field of Classification Search ........... 340/572.1, 340/572.4, 572.8, 10.1, 10.51, 825.69, 539.22; 709/220
See application file for complete search history.

(56) References Cited

U.S. PATENT DOCUMENTS

| | | | |
|---|---|---|---|
| 5,650,768 A | 7/1997 | Eswaran |
| 5,910,776 A | 6/1999 | Black |
| 6,405,261 B1 | 6/2002 | Gaucher |
| 6,631,363 B1 | 10/2003 | Brown et al. |
| 6,677,852 B1 | 1/2004 | Landt |
| 6,732,923 B2 | 5/2004 | Otto |
| 6,784,802 B1 | 8/2004 | Stanescu |
| 6,908,034 B2 | 6/2005 | Alleshouse |
| 6,943,683 B2 | 9/2005 | Perret |
| 7,155,305 B2 | 12/2006 | Hayes et al. |
| 7,204,409 B2 | 4/2007 | Kumar et al. |
| 7,267,275 B2 | 9/2007 | Cox et al. |
| 2002/0059471 A1 | 5/2002 | Sanghvi et al. |
| 2002/0070865 A1 | 6/2002 | Kenneth et al. |
| 2002/0170952 A1 | 11/2002 | Alsafadi et al. |
| 2003/0135576 A1 | 7/2003 | Bodin |
| 2003/0144926 A1 | 7/2003 | Bodin et al. |
| 2003/0225928 A1 | 12/2003 | Paul |
| 2003/0227392 A1 | 12/2003 | Ebert et al. |

(Continued)

FOREIGN PATENT DOCUMENTS

EP     11632893     3/2006

(Continued)

OTHER PUBLICATIONS

International Search Report dated and mailed Jul. 27, 2007 for PCT Application Serial No. PCT 2007/004005, 6 pages.

(Continued)

*Primary Examiner*—Tai Nguyen
(74) *Attorney, Agent, or Firm*—Amin, Turocy & Calvin, LLP

(57) ABSTRACT

The claimed subject matter provides a system and/or a method that facilitates configuring at least one radio frequency identification (RFID) device. An RFID network can include at least one device associated with a device group, wherein the device group corresponds to a characteristic. An organizational manager can uniformly configure the at least one device based at least in part upon membership of the device group.

14 Claims, 12 Drawing Sheets

U.S. PATENT DOCUMENTS

| | | | |
|---|---|---|---|
| 2004/0046642 A1 | 3/2004 | Becker et al. | |
| 2004/0070491 A1 | 4/2004 | Huang et al. | |
| 2004/0111335 A1 | 6/2004 | Black et al. | |
| 2004/0193641 A1 | 9/2004 | Lin | |
| 2004/0215667 A1 | 10/2004 | Taylor et al. | |
| 2005/0062603 A1* | 3/2005 | Fuerst et al. | 340/539.12 |
| 2005/0092825 A1 | 5/2005 | Cox et al. | |
| 2005/0150952 A1 | 7/2005 | Chung | |
| 2005/0150953 A1 | 7/2005 | Alleshouse | |
| 2005/0237194 A1 | 10/2005 | VoBa | |
| 2006/0047789 A1 | 3/2006 | Kumar et al. | |
| 2007/0024463 A1* | 2/2007 | Hall et al. | 340/825.69 |
| 2007/0035396 A1* | 2/2007 | Chand et al. | 340/572.1 |

FOREIGN PATENT DOCUMENTS

| | | |
|---|---|---|
| WO | WO 03/102845 | 7/2003 |
| WO | 03102845 | 12/2003 |
| WO | WO 2005078633 | 8/2005 |

OTHER PUBLICATIONS

Floerkemmier, et al. "PML Core Specification 1.0" Sep. 13, 2003, Auto-ID Center, Version 1.0, 48 pages.

European Search Report dated May 11, 2006, mailed May 12, 2006 for European Patent Application Serial No. EP05107744, 9 pages.

European Search Report dated Mar. 9, 2006, mailed Mar. 27, 2006 for European Patent Application Serial No. EP05107744, 7 pages.

European Search Report dated Oct. 4, 2006 and mailed Apr. 11, 2006 for EP 05108005, 9 pages.

European Search Report dated Mar. 9, 2006 mailed Mar. 22, 2006 for European Patent Application Serial No. EP05107794, 7 pages.

Anonymous: "The Sun Global RFID Betwork Vision: Connecting Businesses at the Edge of Network" Internet Article, Jul. 2004, http://www.sun.com/software/solutions/rfid/Sun_RFIS_Vision_rla.pdf.

U.S. Appl. No. 11/025,702, filed Feb. 18, 2005, Kumar et al.

U.S. Appl. No. 11/061,337, filed Mar. 1, 2005, Kumar et al.

U.S. Appl. No. 11/069,459, filed Feb. 18, 2005, Kumar et al.

U.S. Appl. No. 11/061,356, filed May 31, 2005, Kumar et al.

U.S. Appl. No. 11/141,619, filed May 31, 2005, Kumar et al.

U.S. Appl. No. 11/140,726, filed May 31, 2005, Kumar et al.

U.S. Appl. No. 11/141,533, filed May 31, 2005, Agarwal et al.

European Search Report dated Oct. 2, 2006, mailed Feb. 10, 2006 for European Patent Application Seial No. 05107796, 6 pages.

Tsetsos, et al. "Commerical Wireless Sensor Networks: Technical and Business Issues" Proceedings of the Second Annual Conference on Wireless On-Demand Network Systems and Services (Jan. 19-21, 2005) 8 pages.

Branch, et al. "Sentire: A Framework for Building Middleware for Sensor and Actuator Networks" Proceedings of the Third International Conference on Pervasive Computing and Communications Workshops Mar. 8, 2005) pp. 396-400.

Harrison, et al. "Information Management in the Product Lifecycle-the Role Networked RFID" Proceedings of the Second IEE International Conference (Jun. 24, 2004) pp. 507-512.

Bornhovd, et al. "Integrating Smart Items with Business Processes An Experience Report" Proceedings of the Thirt-Eighth Hawaii International Conference on System Science (Jan. 3, 2005) 8 pages.

Ganesh, et al. "Web Services and Multi-Channel Integration: A Proposed Framework" Proceedings of the IEEE International Conference on Web Services (Jul. 6, 2004) 8 pages.

European Search Report dated Feb. 6, 2006, mailed Feb. 6, 2006 for European Patent Application Seial No. 05107826, 7 pages.

Ortiz. "An Introduction to Java Card Technology—Part I" http://developers.sun.com/techtopics/mobility/javacard/articles/javacardI/> last viewed Dec. 19, 2005, 14 pages.

Chen. "Understanding Java Card 2.0" URL:.com//javaworld/jw-03-1998/jw-03-javadev_p.html> last viewed Dec. 19, 2005, 12 pages.

Eurpoean Search Report dated Feb. 7, 2006; mailed Feb. 7, 2006 for PCT Application Serial No. EP 05 10 8001; 7 pages.

IBM "alpha Works: RFID Device Development Kit: Overview" http://www/alphaworks.ibm.com/tech/rfiddevice last viewed Nov. 7, 2005, 1 page.

Alien "ALR-9800 Enterprise RFID Reader" http://www.alientechnology.com/docs/AT_DS_9800_v3_WEB.pdf last viewed Nov. 17, 2005, 4 pages.

* cited by examiner

RFID DEVICE GROUPS

BACKGROUND

Many retail, manufacture, and distribution establishments are applying different and innovative operating methods to increase efficiency. These establishments can monitor store inventory to facilitate optimizing supply and demand relating to consumers. One aspect of maximizing profit hinges on properly stocking inventory such that replenishment occurs in conjunction with exhaustion of goods and/or products. For example, a retailer selling a computer and/or a VCR, must stock the computer in relation to its consumer sales, and the VCR in relation to its consumer sales. Thus, if the computer is in higher demand (e.g., more units sold) than the VCR, the retailer can stock the computer more frequently in order to optimize supply and demand, and in turn, profit. Monitoring inventory and associated sales can be a complex task, wherein product activity is comparable to a black box since inner workings are unknown; yet monitoring products is a crucial element in inventory/product efficiency.

Automatic identification and data capture (AIDC) technology, and specifically, Radio Frequency Identification (RFID) has been developed based at least upon the need to cure deficiencies of typical monitoring systems and/or methodologies (e.g., barcode readers, barcodes, and/or UPCs). RFID is a technique of remotely storing and retrieving data utilizing RFID tags. Since RFID systems are based upon radio frequency and associated signals, numerous benefits and/or advantages precede traditional techniques in monitoring products. RFID technology does not require a line of sight in order to monitor products and/or receive signals from RFID tags. Thus, no manual scan is necessary wherein the scanner is required to be in close proximity of the target (e.g., product). Yet, range is limited in RFID based upon radio frequency, RFID tag size, and associated power source. Additionally, RFID systems allow multiple reads within seconds providing quick scans and identification. In other words, an RFID system allows a plurality of tags to be read and/or identified when the tags are within a range of an RFID reader. The capability of multiple reads in an RFID system is complimented with the ability of providing informational tags that contain a unique identification code to each individual product.

Moreover, RFID systems and/or methodologies provide real-time data associated to a tagged item. Real-time data streams allow a retailer, distributor, and/or manufacturer the ability to monitor inventory and/or products with precision. Utilizing RFID can further facilitate supplying products on a front-end distribution (e.g., retailer to consumer) and a back-end distribution (e.g., distributor/manufacturer to retailer). Distributors and/or manufacturers can monitor shipments of goods, quality, amount, shipping time, etc. In addition, retailers can track the amount of inventory received, location of such inventory, quality, shelf life, etc. The described benefits demonstrate the flexibility of RFID technology to function across multiple domains such as, front-end supply, back-end supply, distribution chains, manufacturing, retail, automation, etc.

An RFID system consists of at least an RFID tag and an RFID transceiver. The RFID tag can contain an antenna that provides reception and/or transmission to radio frequency queries from the RFID transceiver. The RFID tag can be a small object, such as, for example, an adhesive sticker, a flexible label and integrated chip, etc. There are typically four different frequencies the RFID tags utilize: low frequency tags (between about 125 to 134 kilohertz), high frequency tags (about 13.56 megahertz), UHF tags (about 868 to 956 megahertz) and Microwave tags (about 2.45 gigahertz).

In general, an RFID system can include multiple components: tags, tag readers (e.g., tag transceivers), tag writers, tag-programming stations, circulation readers, sorting equipment, tag inventory wands, RFID printers, etc. Management of device settings associated to such devices and/or components can be an overwhelming and meticulous task. In particular, configuring such devices and/or components can include repetitive settings and/or properties that are inefficient to implement based at least in part upon the amount of hours required to properly set. Moreover, once device and/or component settings/configurations are set, any adjustments required (e.g., software updates, device and/or component removal/addition, process manipulation, RFID system adjustment, etc.) can be just as, if not more, costly, inefficient, and/or overwhelming as initial setup.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate managing a device related to an RFID network. An organizational manager can provide uniform configuring and/or managing to at least one device within the RFID network based at least in part upon a membership to a device group. The device group can be based on at least one of the following: device physical location, device functionality, device security level, process device association, make and/or model of device, type of device, device frequency, etc. By utilizing a device group in connection with management of the devices within the RFID network, device settings, configurations, properties, security settings, process bindings, group membership, rule bindings, etc. can be manipulated by group membership. The grouping can include a name and a description, wherein the grouping can also contain other device groups and/or individual devices. Once the device is included with a particular group, the entire group can be managed by providing uniform and/or collective application of device properties, device configurations, security settings, process bindings, rule bindings, etc. The organizational manager can utilize groups of devices associated with an RFID network to manage various characteristics associated with such individual devices. The organizational manager can provide uniform configuration of device properties based at least in part upon a membership to a device group. Moreover, the organizational manager can create, delete, rename such groups as well as apply device properties uniformly to such devices within a group.

In accordance with one aspect of the claimed subject matter, the organizational manager can include a transfer component. The transfer component provides group membership manipulation for a device associated with the RFID network. The transfer component can re-establish a relationship between a device and a device group based at least in part upon a user request to transfer a particular device from one device group to a disparate device group. In addition, the transfer component can move a device group to a disparate device group.

In accordance with another aspect of the claimed subject matter, thee organizational manager can utilize a bind component that maintains a relationship between an RFID process and at least one of a device and a device group including associated devices. Moreover, the bind component can allow a device group and/or a device to bind to a particular RFID process. The RFID process can be related to a particular RFID sub-system (e.g., an RFID server, RFID network, etc.) that is an uber or high-level object that forms together various entities to create a meaningful unit of execution. The RFID process can be an outbound process (e.g., pick, pack, shipping scenario, etc.), a manufacturing process, a shipping process, a receiving process, tracking, data representation, data manipulation, data application, security, . . .

In accordance with another aspect of the innovation described herein, the organizational manager can include a security component. The security component can provide security techniques to protect and/or ensure the integrity of the data related to the organizational manager. In general, the security component can implement security to a device group, a device, any combination thereof, a process, a business process, etc. The security component can provide security at a granular level and/or global manner based at least in part upon the hierarchically organized device groups. In addition, the organizational manager can utilize a presentation component that provides various types of user interfaces to facilitate interaction with a user. In other aspects of the claimed subject matter, methods are provided that facilitate managing at least one RFID device within an RFID network in a uniform manner.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
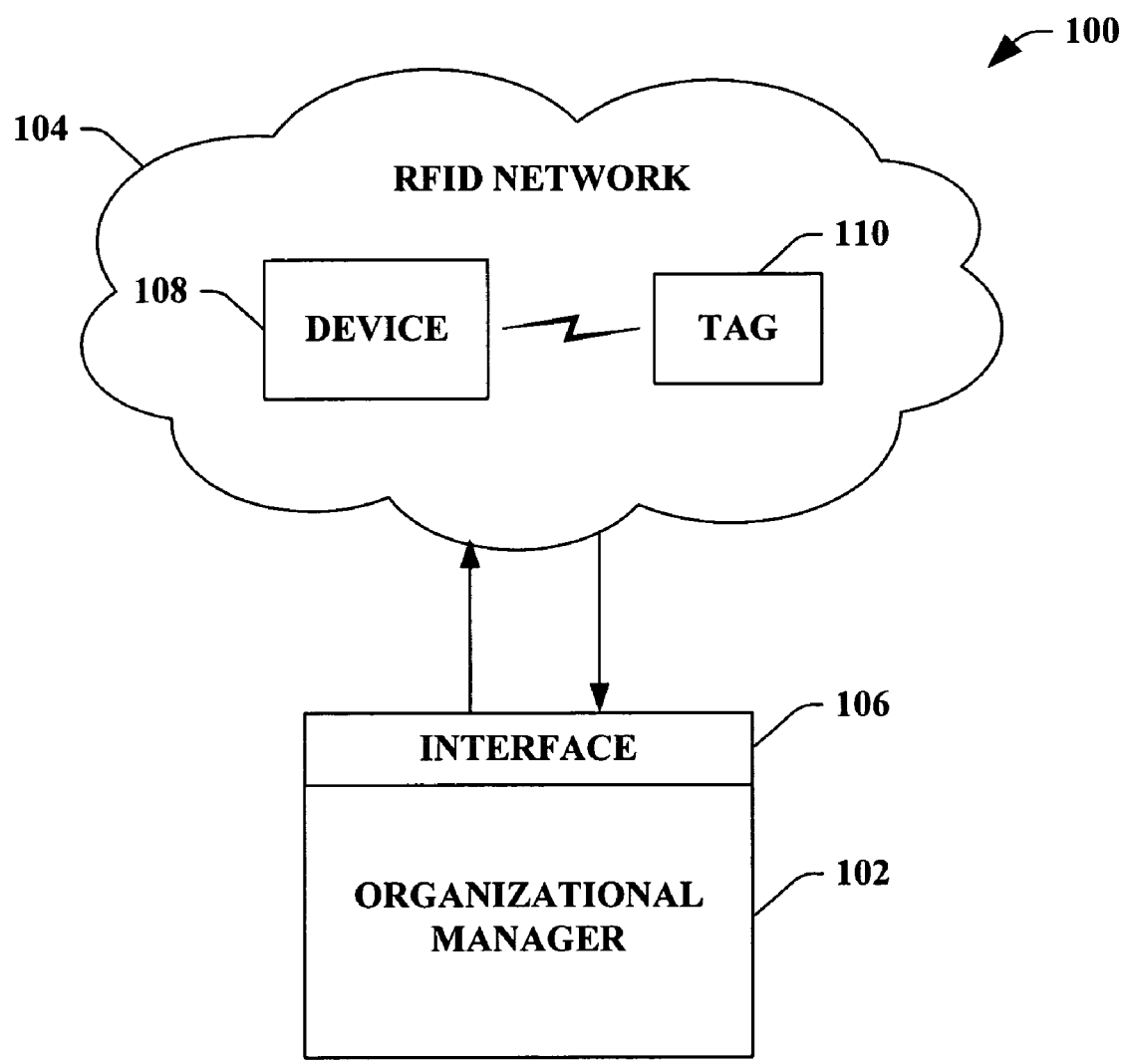
FIG. 1 illustrates a block diagram of an exemplary system that facilitates configuring a device within an RFID network.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," "manager," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates configuring a device within an RFID network.

The system 100 can include an organizational manager 102 that uniformly manages and/or configures at least one device associated with a radio frequency identification (RFID) network 104. The organizational manager 102 can receive data related to the RFID network 104 via an interface 106 (discussed infra), wherein such data allows seamless and uniform management of the RFID network 104. In particular, the organization manager 102 can provide uniform configuration and/or management to at least one device 108 within the RFID network 104.

The organizational manager 102 can apply device property settings to the device 108 based at least in part upon an association with a group, wherein such group can be determined by a location, a function, a security, process device association, make and/or model of device, type of device, device frequency, etc. Once the device 108 is included with a particular group, the entire group can be managed by providing uniform and/or collective application of device properties, device configurations, security settings, process bindings, rule bindings, etc. Furthermore, the organizational manager 102 can utilize a user interface (not shown, discussed infra) that facilitates managing at least one device 108. For instance, the user interface can utilize a hierarchical tree, wherein the various groups of devices within the RFID network 104 can be represented. Such representation can allow a user to move a reference name (e.g., representing a physical device 108 within the RFID network 104) to a group (e.g., if not associated with an existing group) and/or a disparate group (e.g., if associated with a group), wherein such movement allows the device properties, device configurations, security settings, process bindings, rule bindings, etc. to be updated to the device properties, device configurations, security settings, process bindings, rule bindings, etc. of that particular group moved thereto. In addition to allowing a move in connection with a device reference name and/or a device group reference name, the representation can allow a bind, security setting, rename, property setting, etc. to be applied to the group and/or device.

It is to be appreciated that the device 108 can receive a signal from, for instance, at least one tag 110 and/or a plurality of tags. In one example, the tag 110 can contain an antenna that provides reception and/or transmission to radio frequency queries from the device 108. Furthermore, it is to be appreciated that the device 108 within the RFID network 104 can be, but is not limited to being, an RFID reader, an RFID writer, an RFID printer, a printer, a reader, a writer, an RFID transmitter, an antenna, a sensor, a real-time device, an RFID receiver, a real-time sensor, a device extensible to a web service, and a real-time event generation system. Additionally, although a single device 108 and tag 110 are depicted, it is to be appreciated that a plurality of devices 108 and tags 110 can be utilized with the system 100.

In one example, the RFID network 104 can include at least one device 108 that is associated with at least one RFID process (not shown). It is to be appreciated that the RFID process can utilize any suitable number of devices 108 within the RFID network 104. An RFID process can be related to a particular RFID sub-system (e.g., an RFID server, RFID network, etc.) that is an uber or high-level object that forms together various entities to create a meaningful unit of execution. The RFID process can be and/or can include an outbound process (e.g., pick, pack, shipping scenario, etc.), a manufacturing process, a shipping process, a receiving process, tracking, data representation, data manipulation, data application, security, . . . Additionally, the RFID process can include and/or respond to a device service, a tag read, an event, a tag write, a device configuration, a geographic tracking, a number count, etc. It is to be appreciated that the process can have raw data collected via at least one device associated with the RFID network 104, wherein such raw data can be manipulated based at least in part upon a rule and/or a business rule engine (not shown).

Moreover, the system 100 can include any suitable and/or necessary interface component 106 (herein referred to as "interface 106"), which provides various adapters, connectors, channels, communication paths, etc. to integrate the organizational manager 102 into virtually any operating and/or database system(s). In addition, the interface 106 can provide various adapters, connectors, channels, communication paths, etc., that provide for interaction with the organizational manager 102, the RFID network 104, and any other device and/or component associated with the system 100.

Figure 2:
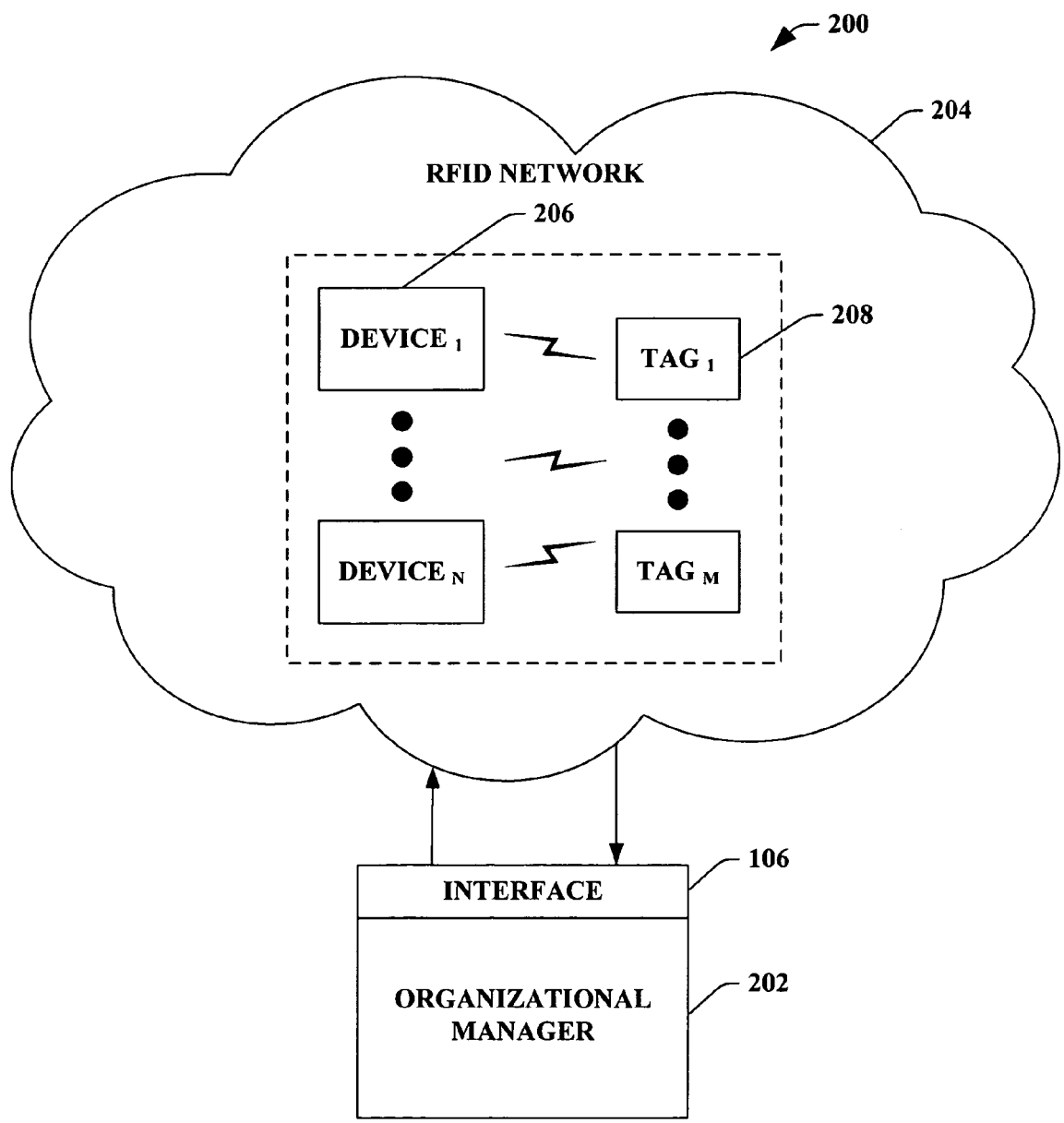
FIG. 2 illustrates a block diagram of an exemplary system that facilitates uniformly distributing device configurations to a plurality of devices.

FIG. 2 illustrates a system 200 that facilitates uniformly distributing device configurations to a plurality of devices. The system 200 can include the interface 106 that can facilitate receiving data related to an RFID network 204, wherein an organizational manager 202 can provide simplified management of at least one device within the RFID network 204. The organizational manager 202 can provide uniform configuration and/or management to a device within the RFID network 204 based at least in part upon a grouping. The grouping of devices within the RFID network 204 can be based on at least one of the following: device physical location, device functionality, device security level, process device association, make and/or model of device, type of device, device frequency, etc. By utilizing a group in connection with management of the devices within the RFID network 204, device settings, configurations, properties, security settings, process bindings, group membership, rule bindings, etc. can be manipulated by group. The grouping can include a name and a description, wherein the grouping can also contain other device groups and/or individual devices. It is to be understood that the organizational manager 202 and the RFID network 204 can be substantially similar to the organizational manager 102 and the RFID network 104 depicted in FIG. 1.

The RFID network 204 can be implemented by any enterprise, business, facility, and/or any suitable entity that can utilize RFID technology. For instance, the RFID network 204 can be deployed to include any number of devices 206 such as $device_1$ to $device_N$, where N is positive integer. Moreover, such devices 206 can interact (e.g., wirelessly communicate) with any number of tags 208 such as $tag_1$ to $tag_M$, where M is a positive integer. It is to be appreciated that the devices 206 can be at least one of the following: an RFID reader, an RFID writer, an RFID printer, an RFID transmitter, a sensor, a real-time device, an RFID receiver, a real-time sensor, a device extensible to a web service, a real-time event generator, etc. In addition, the device 206 can be associated with at least an antenna to communicate data. Furthermore, it is to be appreciated that the tags 208 can be associated to any suitable object related to the enterprise, business, facility, and/or any suitable entity utilizing such RFID technology.

The devices 206 can be associated with at least one RFID process (not shown). It is to be appreciated that the RFID process can run in the same host as the organizational manager 202. Although only a single RFID process is depicted, it is to be appreciated that a plurality of RFID processes can be executed in conjunction with the RFID network 204. The RFID network 204 can include various sub-systems and/or groups based at least in part upon device location, device functionality, device security level, process device association, make and/or model of device, type of device, device frequency, etc. For example, an RFID network 204 can include two groups and/or collections of devices, one at a shipping door and another at a receiving door. Such RFID network 204 can further include a process associated with each groups and/or collection of devices. For instance, the process can be a shipping process that is related to the devices at the shipping door, wherein the devices can collect data at such location. Similarly, another process can be a receiving process that is related to the devices at the receiving door, wherein the devices can collect data at such location.

Furthermore, the RFID process can be a business process, wherein the devices 206 can be indirectly utilized in association with the business process (not shown). In an example, the RFID stack can bridge the gap between devices 206 and business applications. The business process can be, for instance, a business application to achieve a critical business function. For instance, the business application can be a back end application, an existing business application, a line of business (LOB) application, an accounting application, a supply chain management application, a resource planning application, and/or a business monitoring (BAM) application. In addition, the critical business function can be, for example, a demand plan, a forecast, and/or an inventory control with the incorporation of RFID data in real-time. In another example, an RFID host associated with the RFID network 204 can utilize a business rules engine (not shown), wherein such business rules engine can provide a rule-based system in association with any application related to the RFID network 204 such that a filter and/or alert can be utilized as a rule(s). The business rules engine can execute declarative filters and/or alerts as rules associated with an RFID network 204, wherein the rules can include a rule set adhered to an event, condition, and action format utilizing an extensible markup language (XML). The rule is at least one of the following: contained within a rule set that adheres to an event, a condition, and an action; and represented utilizing an extensible markup language (XML). Moreover, the condition has at least one of a set of predicates and a logical connective to form a logical expression that evaluates to one of a true and a false.

The process can be an uber and/or high-level object that can provide a meaningful unit of execution. For instance, the process can be a shipping process that represents multiple devices at various dock doors working together to perform tag reads, filtering, read enrichment, alert evaluation, and data storage in a sink for a host application to retrieve/process. In another example, the process can execute a manufacturing process, wherein devices are configured to read as well as write dependent upon a location. Moreover, additional functions such as filtering, alerting, enriching, etc. can be implemented at the location. In yet another example, the process can write to a tag process, wherein a tag can be written in real-time based at least upon an input. The write process can also check if the write succeeded by reading and passing data back to the host.

Figure 3:
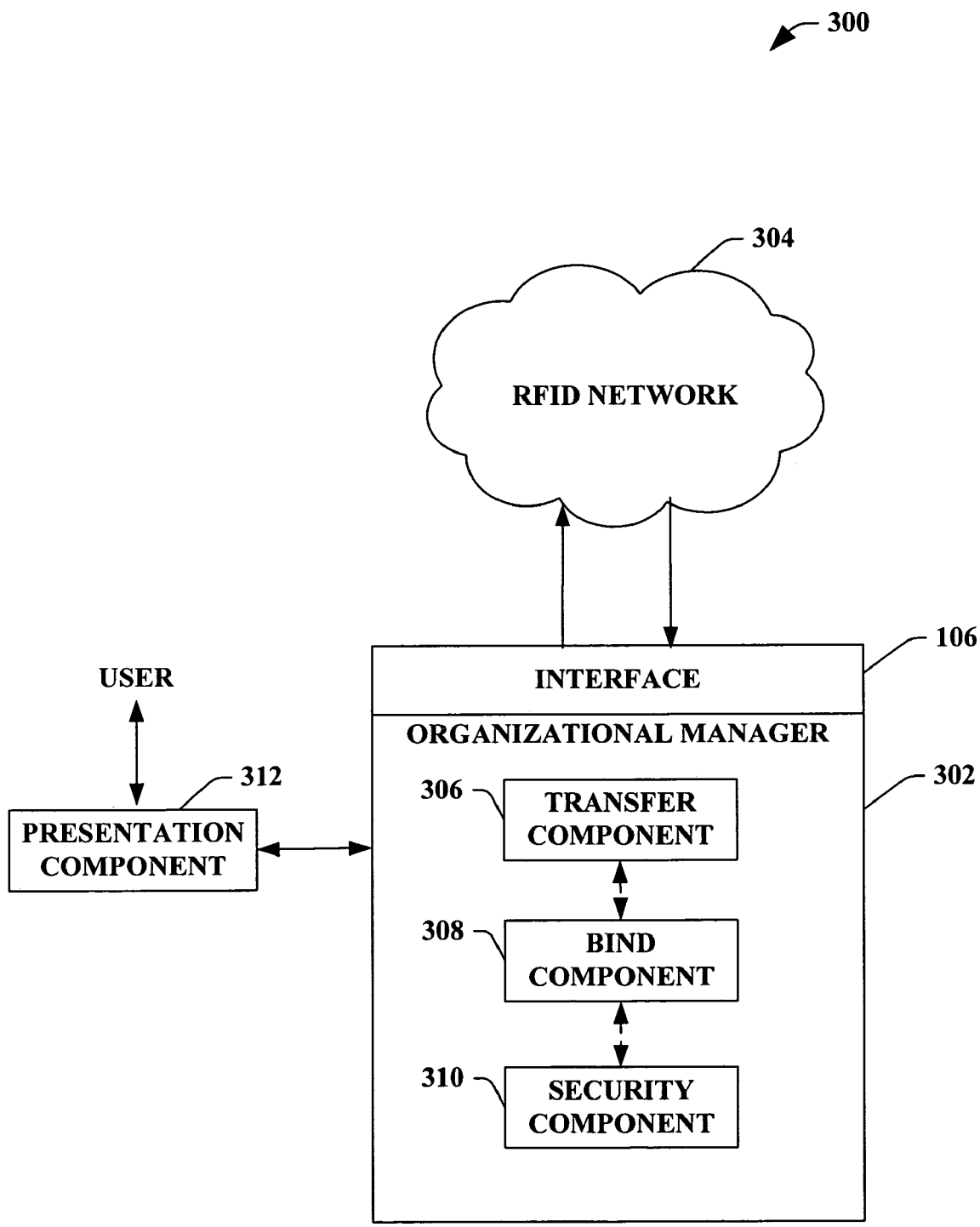
FIG. 3 illustrates a block diagram of an exemplary system that facilitates managing at least one RFID device within an RFID network in a uniform manner.

FIG. 3 illustrates a system 300 that facilitates managing at least one RFID device within an RFID network in a uniform manner. The system 300 provides uniform management that enhances productivity and improves reliability of RFID device management by utilizing an organizational manager 302 (e.g., a runtime related to the RFID stack). The organizational manager 302 can utilize groups of devices associated with an RFID network 304 to manage various characteristics associated with such individual devices. The grouping of devices within the RFID network 304 can be based on at least one of the following: device physical location, device functionality, device security level, process device association (e.g., grouping devices based at least in part upon which process receive events from such devices), make and/or model of device, type of device, device frequency, etc. By utilizing a group in connection with management of the devices within the RFID network 304, device settings, configurations, properties, security settings, process bindings, group membership, rule bindings, etc. can be manipulated by group rather than one by one techniques (e.g., except for the case where a single device related to a group). The organizational manager 302 and the RFID network 304 can be substantially similar to the organizational manager 202, 102 and the RFID network 204, 104 of FIGS. 2 and 1 respectively.

In one example, a warehouse can deploy 10 RFID readers, wherein Bob is the chief system administrator of the warehouse. The following example illustrates particular scenarios that can be implemented utilizing the organizational manager 302: 1) The readers can be placed in two locations, 5 readers are placed in the receiving area of the warehouse, and 5 readers are placed in the shipping area of the warehouse; 2) The chief system administrator (e.g., a user named Bob) can enforce security on such devices, where Joe manages the shipping area, and Sandy manages the receiving area—Bob and Sandy have rights to manage the receiving area while only Bob and Joe have rights to manage devices in the shipping area; 3) There are two RFID business processes referenced by "Shipping" and "Receiving," wherein these processes receive events from the shipping and receiving area devices respectively; and 4) When administering receiving area devices, Bob wants to apply a device property to all the devices within a particular group.

The organizational manager 302 can utilize groups of devices associated with an RFID network 304 to manage various characteristics associated with such individual devices. The organizational manager 302 can provide uniform configuration of device properties based at least in part upon a membership to a device group. The organizational manager 302 can open a synchronous connection to the device for each device in the specified device group. In one example, the organizational manager 302 can construct an "ApplyPropertyProfileCommand" object based on the given property profile, wherein a command to apply properties can be executed, and the connection can be closed. For instance, the following pseudo code can be implemented to apply device properties uniformly to a particular device group: ApplyPropertyProfileForDeviceGroup (string deviceGroup, PropertyProfile PropertyProfile).

Moreover, the organizational manager 302 can create, delete, rename such groups as well as apply device properties uniformly to such devices within a group. A new device group can be created by the organizational manager 302 based on a specified device group definition. In addition, a parent device group name can be at least one of a root device group (e.g., which is the device group at the root of the hierarchy) and a custom created device group. The new device group can be created under a specified parent device group. In the example of creating the new device group which is empty (e.g., no other existing device groups therewith), soft-link re-computation may not be triggered. It is to be appreciated that the soft link can be when a device is indirectly bound to the device (e.g., when the device is part of a group and the organizational manager 302 binds to the group). The root device group can be created by, for instance, an internal RFID service. The following pseudo code can be utilized to implement the creation of a device group: CreateDeviceGroup (DeviceGroupDefinition deviceGroupDefinition, string parentDeviceGroupName).

The organizational manager 302 can further delete device group based at least in part upon a user request. If a delete attempt is requested on a device group, the organizational manager 302 examines the hierarchy to ascertain whether the specified device group is empty. If the device group is non-empty, the operation may not be executed, and the existence of a hard link to the device group is ascertained. It is to be appreciated that the hard link can be when a process directly binds to the device. Such information can be received by examining the hierarchy and/or a binding manager (not shown) by executing, for instance, the pseudo code: GetHardLinksForDeviceEntity (string deviceEntityName). Thus, if there is a hard link to the device group, the operation may not be allowed (e.g., the binding can be updated before the operation is executed). Additionally, if there is not a hard link and/or the condition of not falling within the existence of a hard link, the organizational manager 302 can execute the operation. It is to be appreciated that the binding manager may not be notified of such change as the specified device group is empty so no device mappings exist that need to be updated. Furthermore, the following command is an example of pseudo code that can be implemented to perform the delete operation: DeleteDeviceGroup( ).

In addition, the organizational manager 302 can provide the renaming of a group. For example, the following is an example of pseudo code that can be a command to rename a device group: RenameDeviceGroup( ). In one example, a rename attempt can be executed upon ascertaining whether or not a hard link to the particular device group exists. Such information can be received via a binding manager (discussed supra). If there is a hard link to the device group, the operation may not be allowed (e.g., the binding can be updated before the operation is attempted). Otherwise, the organizational manager 302 can complete the rename operation. It is to be appreciated that the organizational manager 302 may not notify the binding manager about such change as the membership of the device group is not affected.

The organizational manager 302 can further utilize a transfer component 306 that provides group membership manipulation for a device associated with the RFID network 304. The transfer component 306 can re-establish a relationship between a device and a device group based at least in part upon a user request to transfer a particular device from one device group to a disparate device group. The transfer component 306 can re-adjust soft links and notify the binding manager based at least in part upon the new membership. At least one of a portion and/or all the soft links based on the source membership can be removed and the soft links based on the target membership can be added. In one example, the following pseudo code can be implemented: NotifyDeviceMove (string deviceName, ICollection<string> newAncestors). It is to be appreciated that the binding manager can ensure that the hard links stay substantially similar after the movement of the device. Furthermore, the organizational manager 302 can update the interested process collection (discussed infra) for the device based on the new device group membership hierarchy.

In another instance, the transfer component 306 can facilitate transferring a device group to a disparate device group (e.g., including the devices already associated with the respective group). The transfer component 306 can re-adjust soft links and notify the binding manager based at least in part upon the new membership. At least one of a portion and/or all the soft links based on the source membership can be removed and the soft links based on the target membership can be added. The following pseudo code can be an example of implementing a transfer of a device group to a disparate device group: NotifyDeivceGroupMove (string deviceGroupName, StringCollection subDevicesCollection, ICollection<string> newAncestors).

The organizational manager 302 can utilize a bind component 308 that can maintain a relationship between an RFID process and at least one of a device and a device group including associated devices. Moreover, the bind component 308 can allow a device group and/or a device to bind to a particular RFID process. For instance, a device group can include 10 RFID readers, wherein such readers can be related to a receiving process that executes within the RFID network 304. By manipulating at least one of the device group and a device within the device group, the relationship to the RFID process can be sustained and/or continued based at least in part upon the device group membership. Thus, if a new device is added to the membership of the 10 RFID readers, the RFID process (e.g., receiving process) can bind to the newly added device. In another example, the device within a particular device group can bind to a disparate RFID process based upon a transfer to a disparate device group utilizing the said disparate RFID process. In still another example, an entire device group can bind to a disparate RFID process. It is to be appreciated that the bind component 308 can maintain the relationship between an RFID process to a device and/or a device group regardless of the manipulation, wherein the RFID process can be a business process including rules, events, conditions, etc.

The bind component 308 maintains the interested process collection (IPC), wherein the IPC can be the list of currently running processes that either have a hard link or a soft link to a device. The IPC can be utilized for posting to a notification queue (not shown) (e.g., the hard links for a device group can be retrieved utilizing a binding manager application programmable interface (API)). A process can be part of the IPC for a device if, for example, the following condition is met: ((Hard-Link Exists || Soft-Link exists) && IsRunning) IDictionary<string, IDeviceManager2BindingEngine> GetInterestedProcess (string deviceName). This can return a list of running processes which currently have either a hard link or a soft link to the specified device. Note that this may not apply to device groups.

The organizational manager 302 can further utilize a security component 310 that can provide security techniques to protect and/or ensure the integrity of the system 300. In general, the security component 310 can implement security to a device group, a device, any combination thereof, a process, a business process, etc. The security component 310 can provide security at a granular level and/or global manner based at least in part upon the hierarchically organized device groups. In particular, the security component 310 can define security, authorization, and/or privileges in accordance with the device groups, wherein at least a portion of the device group and/or device groups can be associated to a specific security level. For instance, a particular device group can be a first security level with distinct security authorizations and/or privileges, while a disparate device group can have a second security level with disparate security authorizations and/or privileges. It is to be appreciated that there can be various levels of security with numerous device groups associated with each level and that the subject invention is not limited to the above example. Moreover, the security component 310 provides granular security and/or privileges to the system 300, wherein at least a portion of the hierarchically structured device group(s) is protected. It is to be appreciated that security component 310 can be a stand-alone component, incorporated into the organizational manager 302, and/or any combination thereof.

In one particular example, the security component 310 can implement security by setting authorization on a device group. Every device can include an "effective security" that can be the net security attained after the security settings of a parent device group and the security associated with the particular device are applied. It is to be appreciated that a device security can be exempt from a security model of a respective parent device group (e.g., substantially similar to a file not inheriting privileges from the respective parent folder).

Continuing with the above example, the following utilizes the term "device entity" to represent either a device or a device group. A device entity security class referenced as "DeviceEntitySecurity" can be defined such that two string collections can be associated therewith. The device entity security class can contain a list of users and/or group accounts that have "admin" permission on the device entity. Moreover, the device entity security class can include a list of users and/or group accounts who have "user" permission on the device entity. The following pseudo code is an example of implementing the above class:

```
Class DeviceEntitySecurity
{
StringCollection adminPermissionCollection;
StringCollection userPermissionCollection;
}
```

The security component 310 can also utilize the following device security groups: a device administrator, a device notification listener, and a device notification. Each of these groups can exist for each device within the system 300. The device administrator can have the highest security privileges and/or levels. The device user can have a lower security privilege and/or level, wherein such device user can read and execute commands on the device(s). In another example, the user can also get notifications. The device listener can listen to notification tags from the device(s).

In another example, the security component 310 can provide security to at least one process associated with the system 300. For instance, different vendors can have disparate processes associated thereto based at least in part upon the tag data received. As stated above, the bind component 308 can bind a process to a group of devices (e.g., readers), and set up the device group. Furthermore, a user can utilize a notification setting, wherein the security setting can be related to the notification to provide access to the process. In particular, if the process is bound to the device group X, that process can receive events from device group X. Yet, if the process does not contain notification data (e.g., credentials), such process may not be able to receive events from group X. Furthermore, the security component 310 can allow a process to be partitioned such that notifications can be received in groups of devices. In another example, a device can send a notification to an RFID server stack, wherein the security component 310 allows a process, such as a business process, to pick up. The administrator can also allow a process that has access to the device group to have access to tag(s) coming from that particular group. Such technique allows the process to be secure in relation to supplying tags, etc.

The following table, table 1, is an example of privileges, roles, and/or justifications implemented by the security component 310. It is to be appreciated that the following table is only one example and the claimed subject matter is not so limited.

| Privilege | Role | Comment/Justification |
| --- | --- | --- |
| Create a device group (DG). | RFID_ADMIN | This is a top level entity that can affect many devices. |
| Update DG membership. | RFID_ADMIN | Adding/removing a device from a DG can affect some other DG (since devices can be part of exactly one DG (not taking into account transitivity)). |
| Set the access control for a DG, Control group membership (e.g., adding/removing members from subgroups of this DG). | The list of users/groups in the adminPermissionCollection for the DeviceEntity. (DG_ADMINs). | DG_ADMINs can add and/or remove members from the other groups of this DG (e.g., the DG_ADMIN group, and the DG_USERS group. DG_ADMINs can automatically become part of the DEVICE_ADMIN group for devices in this DG, unless the device explicitly denies permission. |
| Send synchronous commands to any device in that DG which does not change the state of that device. | DG_USERS (for that particular DG). | Members of this group can automatically become members of the DEVICE_USERS group for devices in that DG, unless the device explicitly denies permission. |
| Set access control for a device. | DEVICE_ADMIN (for that particular device). | DEVICE_ADMINs can add/ remove members from the DEVICE_NOTIFICATION_READER and DEVICE_USER groups. |

-continued

| Privilege | Role | Comment/Justification |
|---|---|---|
| Set properties on a device (e.g., changes the state of the device). | DEVICE_ADMIN (for that particular device) | |
| Send synchronous commands to the device which does not change the state of that device. | DEVICE_USER (for that particular device). | DEVICE_USERs can send commands such as WriteID (which do not affect the state of the device), but cannot send commands like SetProperty (which change the state of the device). |

In addition, the following pseudo code can be utilized to implement a security manager object model in accordance with the claimed subject matter. It is to be appreciated that the following is an example, and the subject innovation is not so limited.

```
void SetDeviceEntitySecurity(string deviceOrDeviceGroup,
DeviceEntitySecurity
security);
DeviceEntitySecurity GetDeviceEntitySecurity(string
deviceOrDeviceGroup);
Void SetSecurityInheritance(string deviceOrDeviceGroup);
Void RemoveSecurityInheritance(string deviceOrDeviceGroup, bool
copyEffectivePermissions);
    //if copyEffectivePermissions is true, then the device or DG get the
    effective
    //permissions of the parent added to the device or DG's own
    permissions
    //before the inheritance link is broken.
Bool GetSecurityInheritance(string deviceOrDeviceGroup);
Class ProcessSecurity
{
    StringCollection ProcessOwners;
    StringCollection ProcessModifiers;
}
Void SetProcessSecurity(string processName, ProcessSecurity
processSecurity);
ProcessSecurity GetProcessSecurity(string processName);
```

The organizational manager 302 can further utilize a presentation component 312 that provides various types of user interfaces to facilitate interaction between a user and any component coupled to the organizational manager 302. As depicted, the presentation component 312 is a separate entity that can be utilized with the organizational manager 302. However, it is to be appreciated that the presentation component 312 and/or similar view components can be incorporated into the organizational manager 302 and/or a stand-alone unit. The presentation component 312 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the organizational manager 302.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 4:
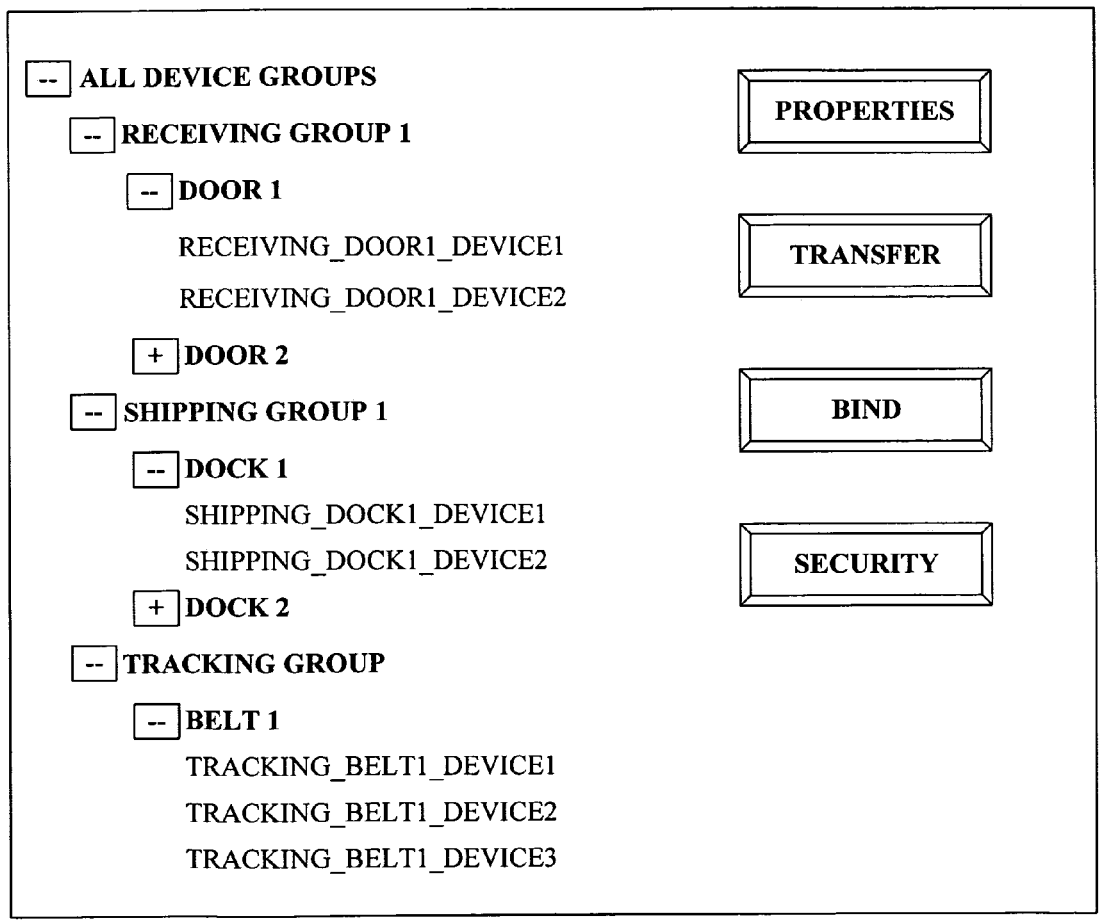
FIG. 4 illustrates a block diagram of user interface that can be utilized in accordance with the claimed subject matter.

FIG. 4 illustrates a user interface 400 that can be utilized in accordance with the claimed subject matter. The user interface 400 can provide a hierarchical representation of at least one RFID device within an RFID network, wherein such RFID devices can be divided and/or partitioned into device groups. The device groups can be based at least in part upon one of the following: a location, a function, a security, process device association, make and/or model of device, type of device, device frequency, etc. In one example, the hierarchical representation can utilize a tree structure as depicted in the user interface 400. In particular, the RFID network (e.g., a RootDeviceGroup, All Device Groups, etc.) can expand into various groups (e.g., Receiving Group 1, Shipping Group 1, Tracking Group, etc.) based on a particular characteristic chosen by a user.

Expanding the tree further, each device group can be divided and/or partitioned into more device groups (e.g., Door 1, Door 2, Dock 1, Dock 2, Belt 1, etc.). Within each group and/or sub-group, at least one RFID device (e.g., Receiving_Door1_Device1, Receiving_Door1_Device2, Shipping_Dock1_Device1, Shipping_Dock1_Device2, Tracking_Belt1_Device1, Tracking_Belt1_Device2, Tracking_Belt1_Device3, etc.) can be associated therewith. It is to be appreciated that the number of device groups, the amount of device groups within a device groups, the number of devices within each group, and/or the number of device within the RFID network are not to be limited by the example above.

The user interface 400 can further include keys and/or fields associated with at least one of the previously described functionality associated with claimed subject matter. For example, the user interface 400 can include fields that implement at least one of the following: uniformly distributing device properties to a selected device group and/or a portion of a device group (e.g., properties); moving a device group and associated devices to a disparate device group and/or moving a device associated with a device group to a disparate device group (e.g., transfer); associating a device and/or a device group with associated devices to a particular process, event, rule, and/or condition (e.g., bind); and configuring a security setting to a device and/or a device group (e.g., security). It is to be appreciated and understood that the above described user interface 400 and functionality is an example and the claimed subject matter is not so limited.

Figure 5:
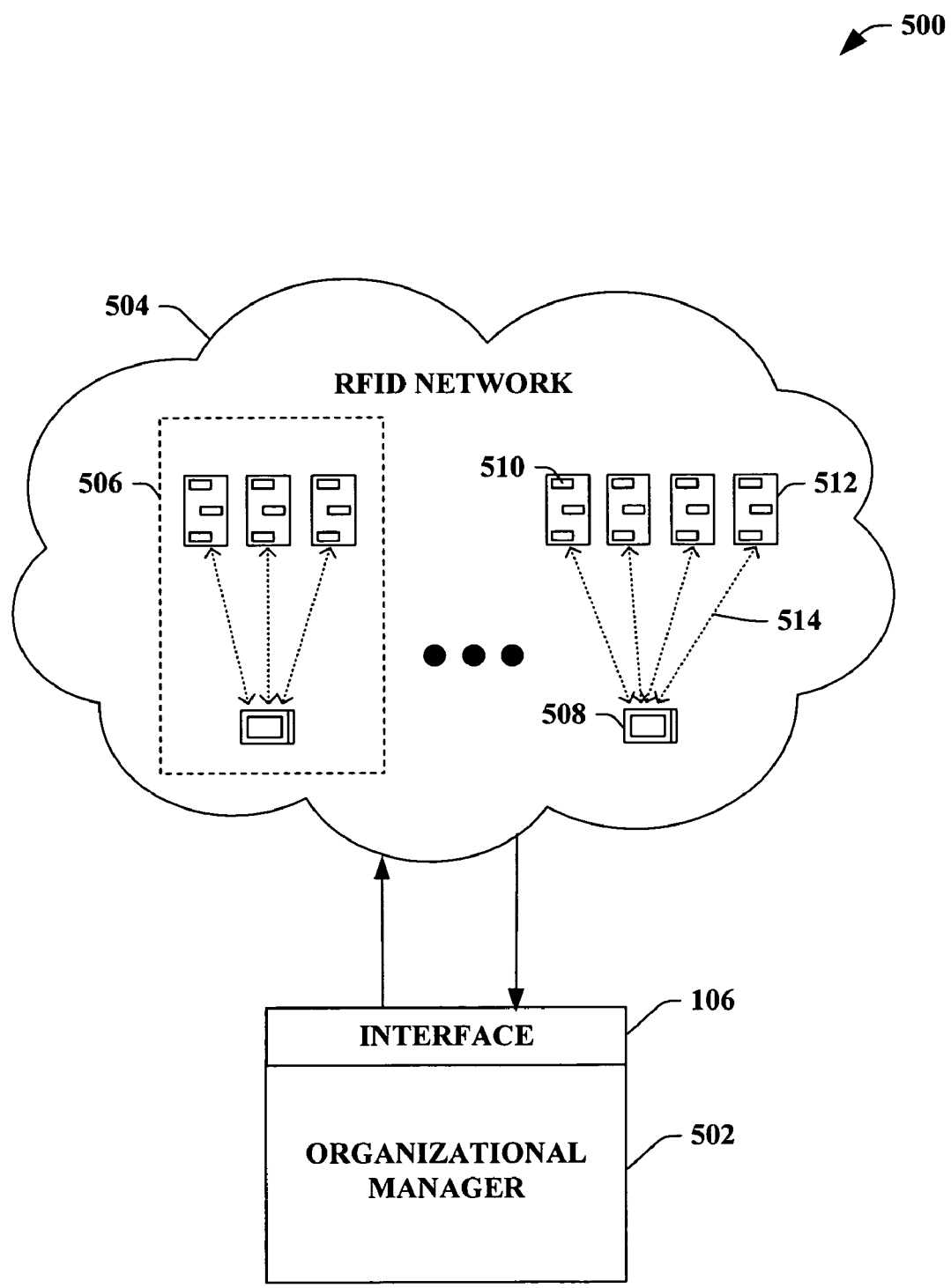
FIG. 5 illustrates a block diagram of an exemplary system that facilitates configuring an RFID device within an RFID network.

FIG. 5 illustrates a system 500 that facilitates uniformly configuring an RFID device within an RFID network. The system 500 can include an organizational manager 502 that implements uniform configuration and/or manipulation associated with an RFID network 504. The organizational manager 502 can provide uniform configuration and/or management to a device within the RFID network 504 based at least in part upon a grouping, wherein the grouping of devices within the RFID network 504 can be based on at least one of the following: device physical location, device functionality, device security level, process device association, make and/or model of device, type of device, device frequency, etc. By utilizing the group in connection with management/configuration of the devices within the RFID network 504, device settings, configurations, properties, security settings, process bindings, group membership, rule bindings, etc. can be manipulated by the organizational manager 502. Furthermore, it is to be appreciated that the organizational manager 502 and the RFID network component 504 can be substantially similar to previously described figures.

The RFID network 504 can include a plurality of universes (e.g., sub-systems, RFID networks), wherein a universe is a server of RFID entities. For simplicity, the RFID network 504 illustrates a single universe containing two collections of devices (e.g., device collections), where a first collection 506 is shown. It is to be appreciated that the device collections can correspond to device groups as utilized by the organizational manager 502, wherein such collections and/or groups can be based on at least one of the following: device physical location, device functionality, device security level, process device association, make and/or model of device, type of device, device frequency, etc. For instance, an RFID sub-system can be a location wherein the entities involved are related to a substantially similar process. In one example, a sub-system can be a warehouse containing a plurality of receiving and/or shipping dock doors with associated devices. Thus, first collection 506 can be a collection of devices within the specified sub-system. It is to be appreciated a plurality of collection of devices can be implemented. Within a collection of devices, a device 508 can receive an RFID signal 514 from a pallet of goods 512 containing at least one RFID tag 510. It is to be appreciated the pallets and/or goods can be tagged based at least upon user specifications (e.g., single pallets tagged, individual goods tagged, pallets and goods tagged, etc.).

Figure 6:
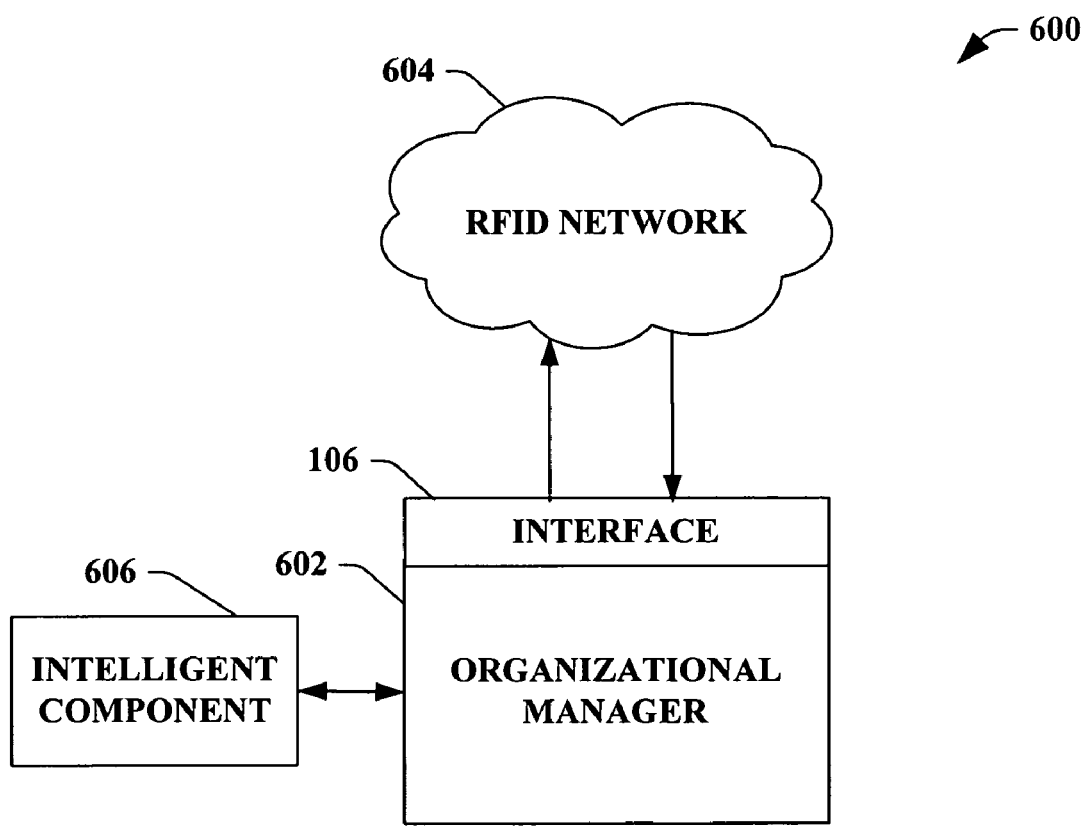
FIG. 6 illustrates a block diagram of an exemplary system that facilitates managing at least one RFID device within an RFID network.

FIG. 6 illustrates a system 600 that employs intelligence to facilitate managing at least one RFID device within an RFID network. The system 600 can include an organizational manager 602, an RFID network 604, and the interface 106 that can all be substantially similar to respective components, managers, networks, and interfaces described in previous figures. The system 600 further includes an intelligent component 606. The intelligent component 606 can be utilized by the organizational manager 602 to facilitate uniformly managing at least one device associated with the RFID network 604. For example, the intelligent component 606 can infer the naming convention utilized with the RFID network 604, device group hierarchical tree structure, security settings associated with the RFID network 604, process bindings, process updates, optimized device groups, optimized device group settings and/or configurations, etc.

It is to be understood that the intelligent component 606 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 7:
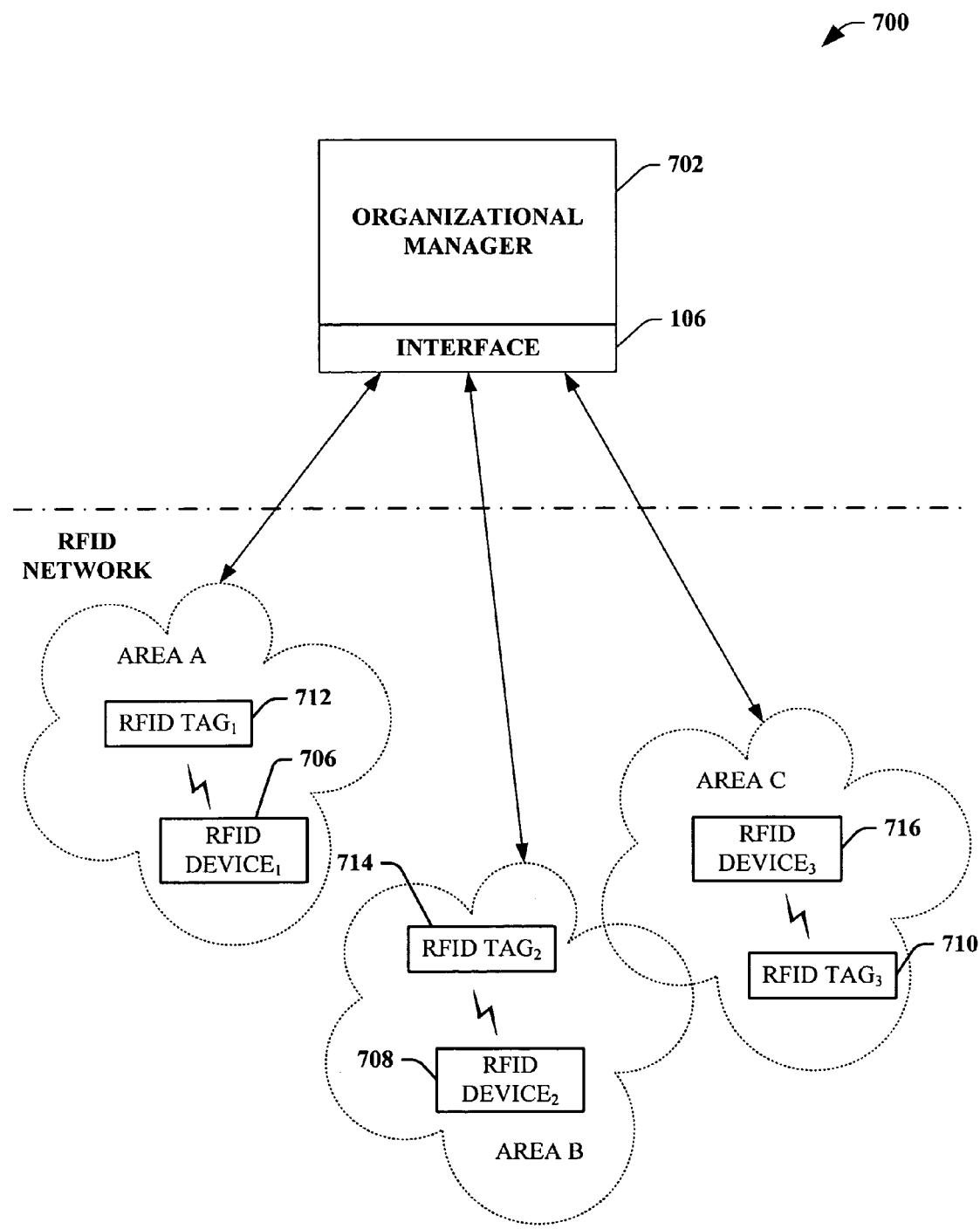
FIG. 7 illustrates a block diagram of an exemplary system that facilitates configuring a plurality of RFID devices uniformly, wherein the RFID devices can be related to various areas within an RFID network.

FIG. 7 illustrates a system 700 that facilitates configuring a plurality of RFID devices uniformly, wherein the RFID devices can be related to various areas within an RFID network. An organizational manager 702 can provide uniform configuration and/or management to at least one device associated with an RFID network. The organizational manager 702 can utilize device groups based on various characteristics associated with the system 700 (e.g., function, location, security, etc.) as discussed above. It is to be appreciated that the organizational manager 702 and the RFID network can be substantially similar to the organizational manager 602, 502, 302, 202, and 102 and the RFID network 604, 504, 304, 204, and 104 depicted in FIGS. 5, 4, 3, 2, and 1 respectively.

In particular, the system 700 illustrates the organizational manager 702 utilizing device groups based at least in part location. Illustrated are RFID devices 706, 708, and 710 (denoted RFID DEVICE$_1$, RFID DEVICE$_2$, and RFID DEVICE$_3$) and associated RFID tags 712, 714, and 716 (denoted RFID TAG$_1$, RFID TAG$_2$, and RFID TAG$_3$) in respective areas (AREA A, AREA B, AND AREA C). It is to be appreciated that each area can be associated with at least one process, and also a process can be associated with a plurality of areas. The devices within each particular area can be represented by a hierarchical tree structure, allowing the organizational manager 702 to provide management at a device group level. It is to be appreciated that the subject innovation is not so limited to such hierarchical representation and also a plurality of device groups can be utilized, wherein a device group can include a device group.

Figure 8:
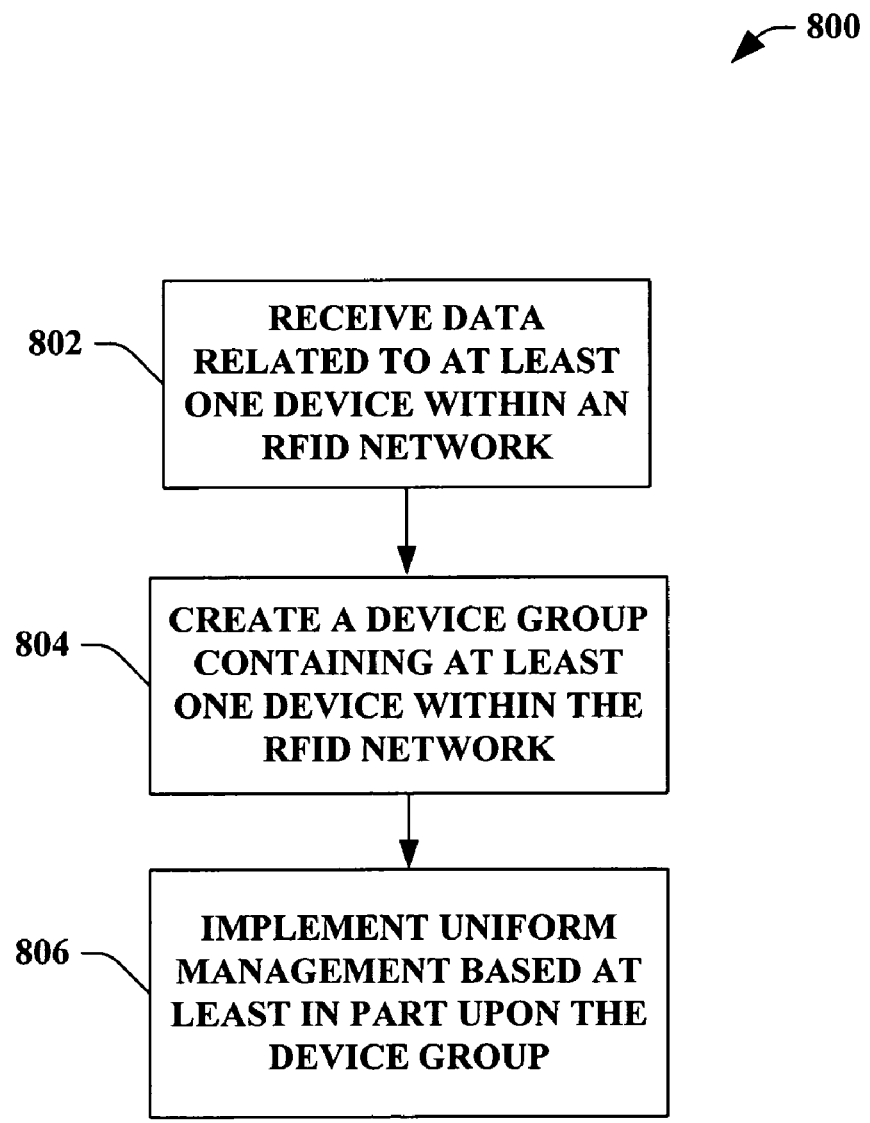
FIG. 8 illustrates an exemplary methodology for configuring a device within an RFID network.
Figure 9:
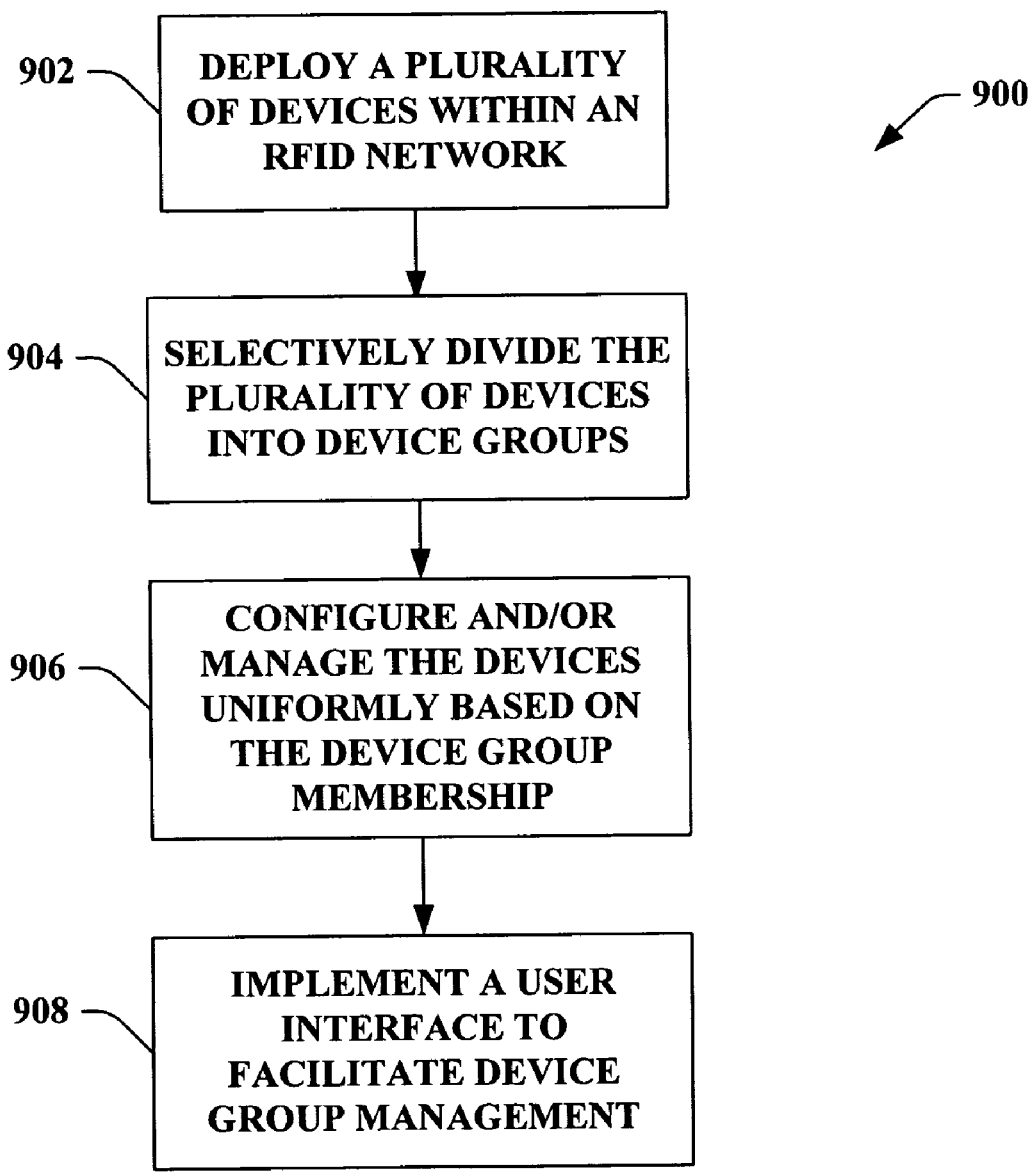
FIG. 9 illustrates an exemplary methodology that facilitates uniformly distributing device configurations to a plurality of devices.
Figure 10:
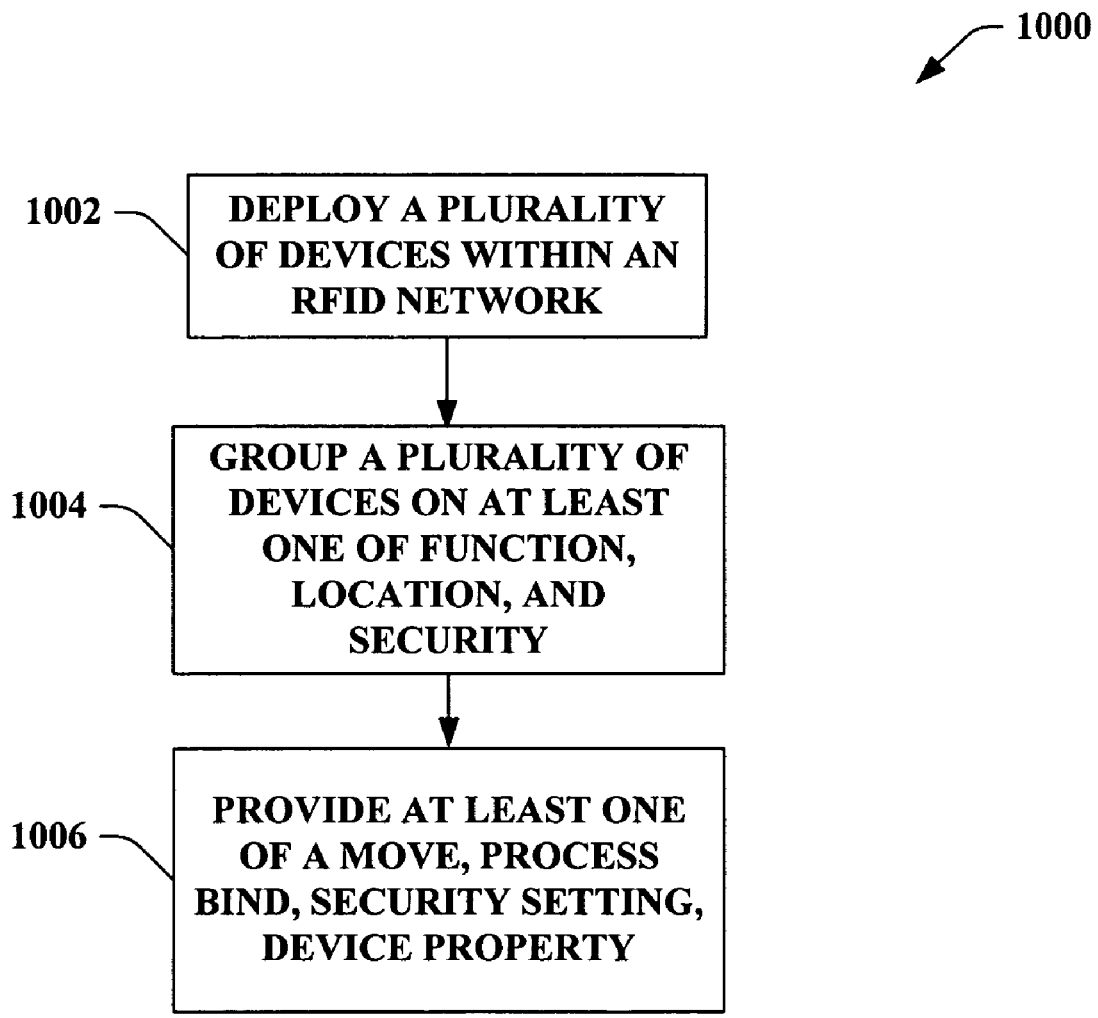
FIG. 10 illustrates an exemplary methodology for managing at least one RFID device within an RFID network in a uniform manner.

FIGS. 8-10 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 8 illustrates a methodology 800 that facilitates configuring a device within an RFID network. At reference numeral 802, data can be received that relates to at least one device within an RFID network. The device can receive a signal from, for instance, at least one tag and/or a plurality of tags. In one example, the tag can contain an antenna that provides reception and/or transmission to radio frequency queries from the device. Furthermore, it is to be appreciated that the device within the RFID network can be, but is not limited to being, an RFID reader, an RFID writer, an RFID printer, a printer, a reader, a writer, an RFID transmitter, an antenna, a sensor, a real-time device, an RFID receiver, a real-time sensor, a device extensible to a web service, and a real-time event generation system.

The RFID network can include at least one device that is associated with at least one RFID process. It is to be appreciated that the RFID process can utilize any suitable number of devices within the RFID network. An RFID process can be related to a particular RFID sub-system (e.g., an RFID server, RFID network, etc.) that is an uber or high-level object that forms together various entities to create a meaningful unit of execution. The RFID process can be an outbound process (e.g., pick, pack, shipping scenario, etc.), a manufacturing process, a shipping process, a receiving process, tracking, data representation, data manipulation, data application, security, . . .

At reference numeral 804, a device group can be created, wherein the device group includes at least one device within the RFID network. The grouping of devices within the RFID network can be based on at least one of the following: device physical location, device functionality, device security level, process device association, make and/or model of device, type of device, device frequency, etc. The grouping can include a name and a description, wherein the grouping can also contain other device groups and/or individual devices. In one example, a user can create at least one device group by utilizing a user interface. Continuing at reference numeral 806, uniform management can be implemented based at least in part upon device group membership. By utilizing a group in connection with management of the devices within the RFID network, device settings, configurations, properties, security settings, process bindings, group membership, rule bindings, etc. can be manipulated by group membership.

FIG. 9 illustrates a methodology 900 for uniformly distributing device configurations to a plurality of devices. At reference numeral 902, a plurality of device can be deployed within an RFID network. It is to be appreciated that the devices can be at least one of the following: an RFID reader, an RFID writer, an RFID printer, a printer, a reader, a writer, an RFID transmitter, an antenna, a sensor, a real-time device, an RFID receiver, a real-time sensor, a device extensible to a web service, a real-time event generation, etc. The RFID network can be implemented by any enterprise, business, facility, and/or any suitable entity that can utilize RFID technology. For instance, the RFID network can be deployed to include any number of devices such as device$_1$ to device$_N$, where N is positive integer. Moreover, such devices can interact (e.g., wirelessly communicate) with any number of tags such as tag$_1$ to tag$_M$, where M is a positive integer.

At reference numeral 904, the plurality of devices can be selectively divided and/or partitioned into device groups. The grouping of devices within the RFID network can be based on at least one of the following: device physical location, device functionality, device security level, process device association, make and/or model of device, type of device, device frequency, etc. Once the device is included with a particular group, the entire group can be managed and/or configured at reference numeral 906. The configuration and/or management of the devices can provide uniform and/or the collective application of device properties, device configurations, security settings, process bindings, rule bindings, etc. At reference numeral 908, a user interface can be implemented to facilitate managing and/or configuring the devices and/or device groups associated with the RFID network. For instance, the user interface can utilize a hierarchical tree, wherein the various groups of devices within the RFID network can be represented.

FIG. 10 illustrates a methodology that facilitates managing at least one RFID device within an RFID network in a uniform manner. At reference numeral 1002, a plurality of devices can be deployed within an RFID network. Continuing at reference numeral 1006, a plurality of devices can be grouped based at least in part upon one of the following: function, location, and security. For example, an RFID network can be utilized within a warehouse, wherein 10 devices are deployed therein. The 10 devices can be split into 2 physical locations at the warehouse—a shipping door and a receiving door. Thus, the devices can be grouped into two device groups based upon physical location within the warehouse. At reference numeral 1006, at least one of a move, process bind, security setting, and device property can be provided. In other words, a device and/or device group can be transferred from one device group membership to another. Furthermore, an RFID process associated and/or executed within the RFID network can be bound to a particular device group. In another example, a security setting and/or device property can be applied based at least in part upon the device group membership.

Figure 11:
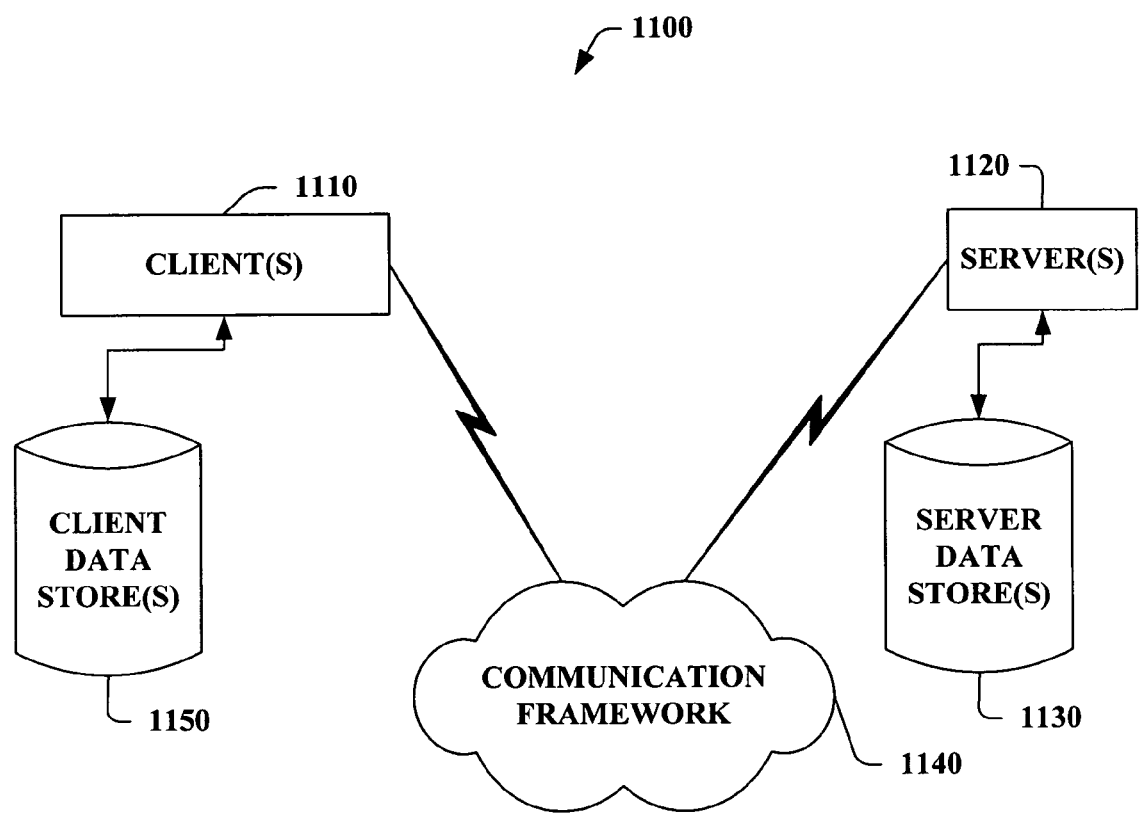
FIG. 11 illustrates an exemplary networking environment, wherein the novel aspects of the claimed subject matter can be employed.
Figure 12:
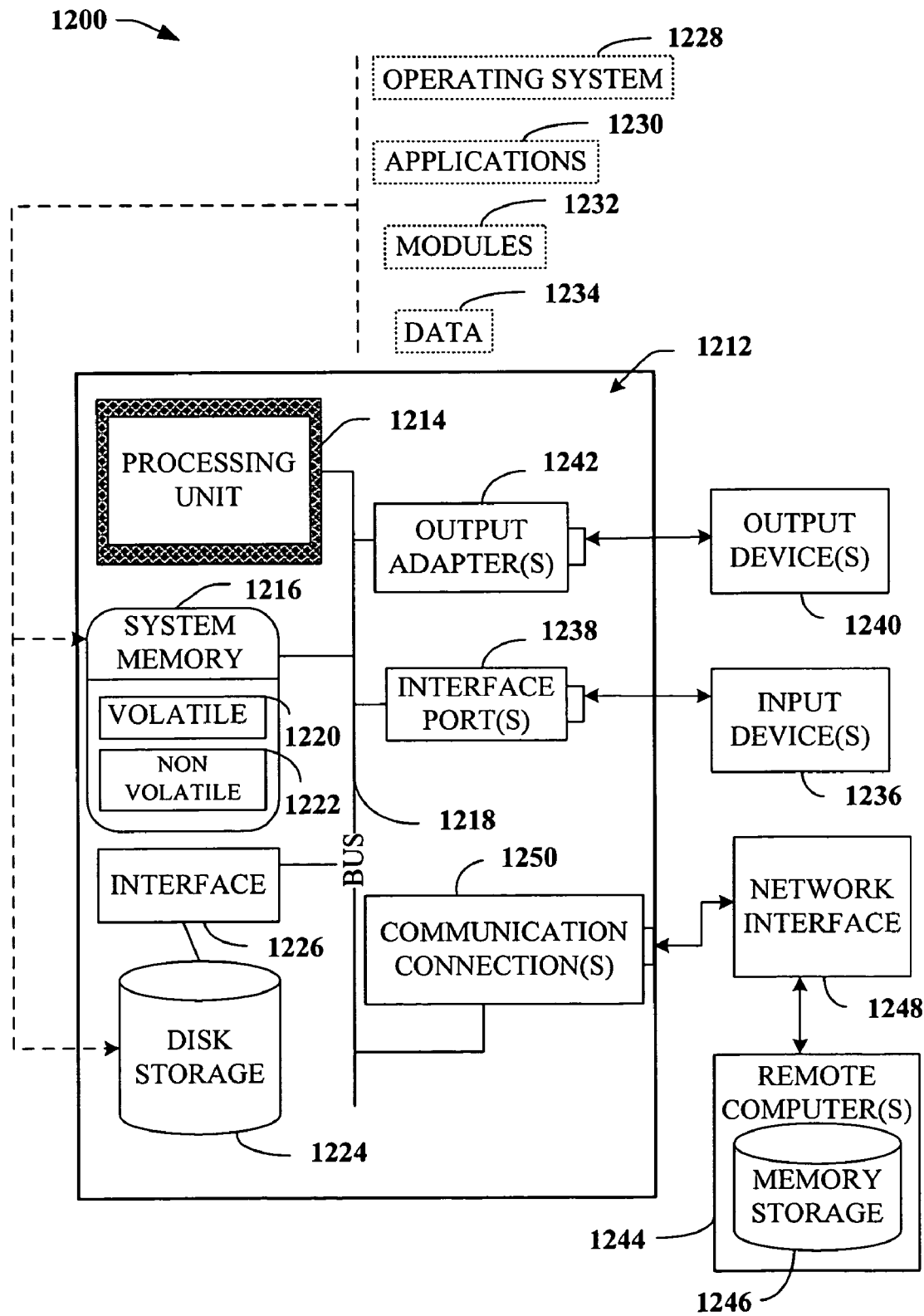
FIG. 12 illustrates an exemplary operating environment that can be employed in accordance with the claimed subject matter.

In order to provide additional context for implementing various aspects of the claimed subject matter, FIGS. 11-12 and the following discussion is intended to provide a brief, general description of a suitable computing environment in which the various aspects of the subject innovation may be implemented. For example, an organizational manager that provides uniform device group management within an RFID network, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 11 is a schematic block diagram of a sample-computing environment 1100 with which the claimed subject matter can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads to perform transformations by employing the subject innovation, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the servers 1120.

With reference to FIG. 12, an exemplary environment 1200 for implementing various aspects of the claimed subject matter includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), or flash memory. Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the claimed subject matter can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates configuring at least one radio frequency identification (RFID) device, comprising:
   an RFID network that includes at least one device associated with a device group that corresponds to a characteristic;
   an organizational manager that uniformly configures at least one device based at least in part upon membership of the device group; and a bind component that binds a process to the device based at least in part upon the membership of the device group, wherein the process utilizes a rule-based system in association with an application related to the RFID network such that at least on of a filter and an alert is a rule-after device group.

2. The system of claim 1, the characteristic is at least one of the following: a location; a function; a security; a process device relationship, wherein the grouping is based at least in part upon which process receive events from such devices; a make of the device; a model of the device; a model of the device; a type of the device; and a device frequency.

3. The system of claim 1, the device group is a representative collection of devices, wherein the device is one of the following: an RFID reader; an RFID writer; an RFID printer; a reader; a writer; an RFID transmitter; an antenna; a sensor; a real-time device; an RFID receiver; a real-time sensor; a device extensible to a web service; and a real-time event generation system.

4. The system of claim 1, further comprising a transfer component that enables a change in device group membership for the device.

5. The system of claim 4, the transfer component enables a change in device group membership for the device group.

6. The system of claim 1, the bind component links a device group and associated devices to the process.

7. The system of claim 1, the rule is at least one of the following: contained within a rule set that adheres to an event, a condition, and an action; and represented utilizing an extensible markup language (XML).

8. The system of claim 7, the condition has at least one of a set of predicates and a logical connective to form a logical expression that evaluates to one of a true and a false.

9. The system of claim 1, the process is a high-level object that forms together at least one entity to create a meaningful unit of execution that relates to at least one of the following: an outbound process; a manufacturing process; a shipping process; a receiving process; a tracking process; a data representation process; a data manipulation process; a security process; and a process utilizing one of an RFID device service, a device collection, a tag read, an event, an event queue, a tag write, a device configuration, and a number count.

10. The system of claim 1, further comprising a security component that provides a security privilege related to the device based at least in part upon membership to the device group.

11. The system of claim 10, the security component utilizes a plurality of distinct security levels that correlates to a plurality of device groups.

12. The system of claim 1, further comprising a presentation component that provides at least one user interface to facilitate interaction between a user and the organizational manager.

13. They system of claim 12, the at least one user interface utilizes a hierarchical tree to represent the device group and the device within the RFID network.

14. The system of claim 1, the RFID network comprises a collection of devices that form a sub-system which includes:

an RFID reader that receives an RFID signal; and an RFID tag that transmits to at least one device.

* * * * *